United States Patent Office 2,726,575
Patented Dec. 13, 1955

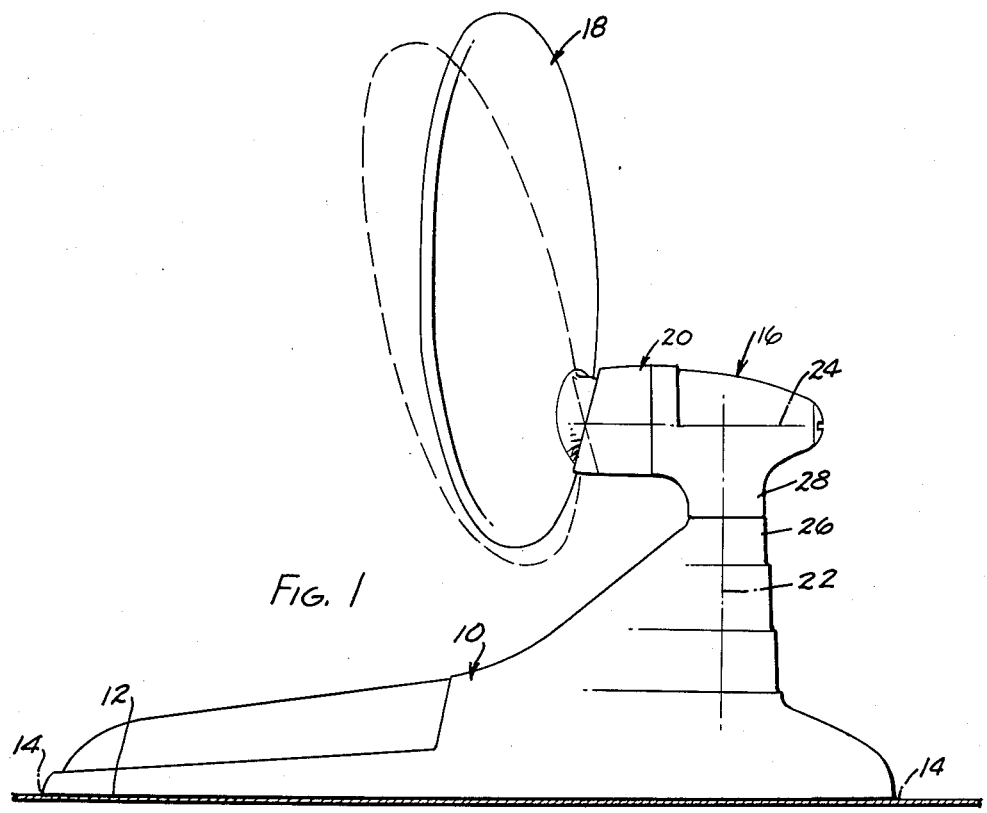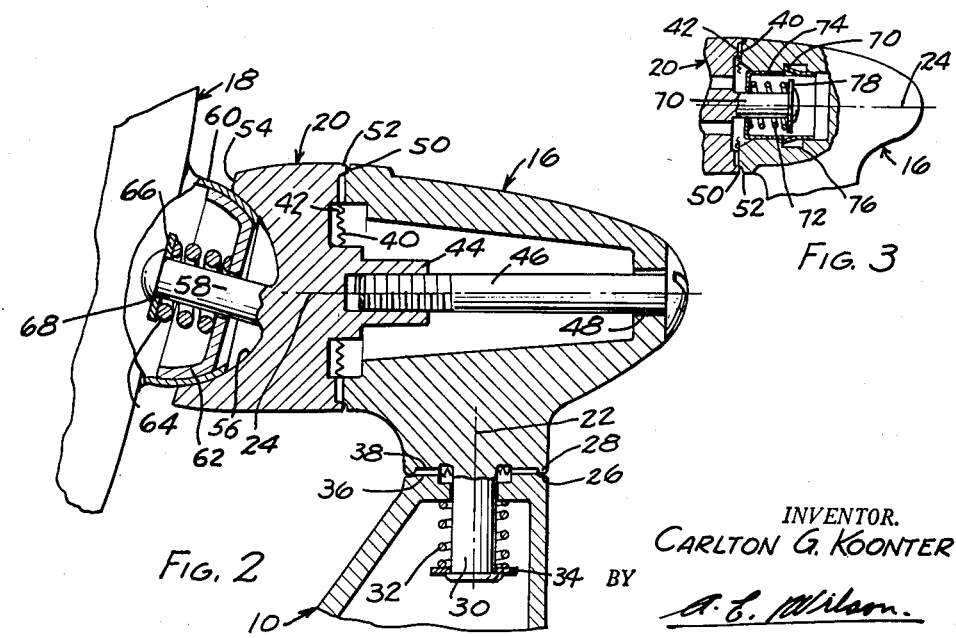

2,726,575

REAR VIEW MIRRORS FOR MOTOR VEHICLES

Carlton G. Koonter, Fairhaven, Mich., assignor to George C. Knight Company, Detroit, Mich., a corporation of Michigan Application December 29, 1953, Serial No. 400,877

3 Claims. (Cl. 88—98)

This invention relates to rear view mirrors for motor vehicles, and more particularly to universally mounted mirrors which can be readily adjusted to permit a driver of a vehicle to observe traffic conditions behind the vehicle on both sides thereof.

Rear view mirrors have been extensively used on motor vehicles to enable the driver to observe road and traffic conditions behind the vehicle. As such mirrors have been constructed heretofore it has been virtually impossible for a driver of a left hand drive vehicle to adjust a mirror on the right hand side of the vehicle in such a manner as to enable him to observe road and traffic conditions behind the vehicle on the right hand side. The same is of course true with drivers of right hand drive vehicles in that it has been extremely difficult for them to adjust the mirror on the left hand side of the vehicle to enable them to observe conditions behind the vehicle on the left hand side.

Many attempts have been made to overcome these difficulties, and while dual rear view mirrors have been used on many vehicles, they are generally employed to give the vehicle a balanced appearance, the driver obtaining virtually no benefits from the mirror positioned on the side of the vehicle opposite the driver's compartment.

In an effort to enable a driver to observe conditions behind the vehicle on the side opposite the driver's compartment special supporting brackets have been employed to dispose the mirror at an appropriate angle that it can be viewed from the driver's compartment. These expedients have not met with commercial success because of the increased costs and other complications of providing left and right hand supporting brackets, and the fact that it has been impossible to design a single bracket that would be suitable for use on the various makes and models of vehicles.

I have found that these difficulties can be overcome by providing additional readily operable adjustments between a mirror head assembly and a supporting bracket whereby the head assembly may be rotated in a plane substantially perpendicular to the longitudinal axis of the supporting base and of the vehicle, and can be oscillated about an eccentric support in a plane substantially parallel to the longitudinal axis of the supporting base, regardless of the plane in which the bracket is mounted on the vehicle. Insofar as I know, no one has provided adjustments in this location. I have found that with these constructions it is possible to provide a single rear view mirror assembly that can readily be used on opposite sides of the vehicle to enable the driver to observe traffic and road conditions behind and on both sides of the vehicle. It is therefore only necessary to provide a single set of tooling for manufacturing the mirror, and it is unnecessary to stock left and right hand mirror assemblies. Manufacturing and selling costs are thus minimized.

An object of this invention is to provide an improved rear view mirror assembly wherein the mirror may be readily adjusted, by rotating and oscillating the head assembly in planes substantially perpendicular and parallel respectively to the axis of the supporting base after it is mounted on a vehicle to dispose the mirror in such a location that when positioned on either side of a vehicle, the driver of the vehicle can readily observe traffic and road conditions behind the vehicle.

Another object of the invention is to employ an eccentric oscillatable member between a mirror shell and a support whereby the angular disposition of the mirror relative to an occupant of a vehicle can be varied as desired.

A further object of this invention is to provide a rear view mirror of improved design having manually operable adjustments between a supporting base and a mirror head assembly.

Another object of the invention resides in the provision of finger tip adjustments between a mirror head assembly and a supporting base whereby the angular relation of the head assembly may be readily varied in any desired plane after the mirror assembly is mounted on a vehicle.

Another object of the invention resides in the provision of a rear view mirror assembly having a supporting base adapted to be secured to the side of a vehicle, and a head assembly rotatably and oscillatably mounted on the supporting base whereby the head assembly may be rotated and oscillated in planes substantially perpendicular and parallel to the axis of the base to position the mirror in such a location that when used on either side of the vehicle, the driver can readily observe road and traffic conditions behind the vehicle.

Yet a further object of the invention is to interpose an eccentric oscillatable member between a mirror shell and a rotatable support mounted on a base whereby the mirror may readily be moved to any desired angular position.

Another object is to provide a rear view mirror having separately operable adjustments whereby the mirror may be readily adjusted angularly through wide limits to accommodate it to individuals varying widely in stature to enable drivers to readily observe rear road and traffic conditions on both sides of the vehicle.

Further objects and advantages of the invention will be apparent from the following description, taken in connection with the appended drawings, in which:

Fig. 1 is a side elevational view of a rear view mirror assembly embodying my invention.

Fig. 2 is a fragmentary enlarged sectional view of a portion of the assembly illustrated in Fig. 1.

Fig. 3 is a fragmentary sectional view of a modified form of the invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now more particularly to the drawings it will be noted that the rear view mirror assembly includes a supporting member or base 10 having an inner surface adapted to be secured to a side panel 12 of a motor vehicle and having a longitudinal axis 14—14. The supporting base 10 may embody any desired shape but is preferably of streamlined contour to harmonize with the styling of modern motor vehicles.

A head assembly consisting of a body portion 16, a mirror shell 18 and an intermediate member 20 is rotatably mounted on the supporting base 10 for adjustment angularly about an axis 22 extending substantially perpendicular to the longitudinal axis 14—14 of the base 10 and about an axis 24 extending substantially parallel to the longitudinal axis 14—14 of the base 10.

The supporting base 10, the body portion 16 and the intermediate member 20 may be formed in any desired manner as by die casting, and is adapted to be secured to the side panel 12 of a motor vehicle with the mirror facing toward the rear of the vehicle.

The supporting base 10 extends outwardly from the vehicle and terminates in an outer substantially flat circular support 26 for the body portion 16 of the head assembly. The body portion 16 of the head assembly is provided with a similar substantially flat circular portion 28 adapted to engage the support 26 of the base 10. A round projection 30 formed on the body portion 16 of the head assembly extends through an aperture in the support 26 of the base 10 to receive a spring 32 held in a tensioned position on the projection 30 by the flared end of the projection 30 engaging a washer 34 surrounding the projection 30. Cooperating serrations 36 and 38 formed on the support 26 of the base 10 and on the portion 28 of the body portion 16 are provided to hold the head assembly in any angularly adjusted position to which it is moved about the axis of the projection 30 extending substantially perpendicularly to the longitudinal axis 14—14 of the supporting base 10.

The angular relation of the head assembly relative to the supporting base 10 can of course be varied as desired by grasping the head assembly and rotating it about the axis 22 of the projection 30, the spring 32 being compressed as the serrations 30 and 38 move relative to each other. The spring 32 holds the body portion 16 of the head assembly in any adjusted position to which it is moved relative to the base 10 with a sufficient force to prevent the head assembly from unintentionally moving out of adjusted position by bumps or vibration to which the vehicle is subjected.

The intermediate member 20 of the head assembly is mounted for oscillating movement relative to the body portion 16 about the axis 24 extending substantially parallel to the longitudinal axis 14—14 of the base 10. Means are provided to maintain the intermediate member 20 in angularly adjusted positions to which it is oscillated relative to the body portion 16. One illustrative example of such retaining means consists of cooperating serrations 40 and 42 formed on the body member 16 and the intermediate member 20 respectively. The intermediate member 20 may be provided with a threaded boss 44 adapted to receive a stud 46 projecting through an aperture 48 in the body portion 16 of the head assembly. The body portion 16 and the intermediate member 20 are preferably formed with cooperating nested sections 50 and 52 to provide a smooth uninterrupted circular exterior surface whereby the contour surface will be uninterrupted regardless of the angular position of the intermediate member 20 relative to the body member 16.

The intermediate member 20 of the head assembly has an angularly disposed end 54 remote from the body portion 16.

The body portion 16 of the head assembly is provided with a spherical recess 56 having a projection 58 extending from its center at an appropriate angle to provide advantageous adjustment, such as at right angles to the projection 30 by which the head assembly is mounted on the supporting base 10.

The mirror shell 18 is provided with a spherical portion 60 adapted to project into the spherical recess 56, and be retained therein in any convenient manner as by a spherical washer 62. The washer 62 is preloaded by a spring 64 surrounding the projection 58, and it is held in place by a washer 66 retained in place by the flanged end of the projection 58 as illustrated at 68.

The outer edges of the shell 18 may be crimped over the edge of the mirror to hold it in place. The mirror may be adjusted angularly relative to the intermediate member 20 by grasping the shell 18 and moving it angularly, the spring 64 retaining the shell in any angularly adjusted position to which it is moved relative to the intermediate member 20.

The longitudinal axis 14—14 of the supporting base 10 extends substantially in alignment with the longitudinal axis of the vehicle. By rotating the body portion 16 of the head assembly about the projection 30, the angular relation of the body portion 16 may be adjusted about an axis substantially perpendicular to the axis 14—14 of the supporting base 10 and of the vehicle. The intermediate member 20 may be oscillated relative to the body portion 16 to vary the angular disposition of the bevelled or angularly related end 54 to the axis of the body portion 16. To accomplish this adjustment the screw 46 may be loosened to permit disengagement of the serrations 40 and 42 whereupon the intermediate member 20 may be oscillated relative to the body member 16. When the mirror has been adjusted to a desirable angular relation the stud 46 may be tightened to engage the serrations 40 and 42 to maintain the intermediate member 20 in a fixed angular relation to the body portion 16.

To summarize briefly, my improved mirror construction employs a triple angular adjustment feature whereby it is possible to adjust the position of the mirror, angularly and positionally to advantageously accommodate it to drivers varying widely in stature.

It will be apparent that with respect to the connection between the base 10 and the body portion 16 the projection may be oppositely disposed to be carried by the base 10 and project into the body portion 16. It will also be apparent that the spring 32 may be dispensed with and a stud employed projecting through either the base 10 or the body portion 16 to maintain the members 10 and 16 assembled in the same manner as the stud 46 is employed to maintain the members 16 and 20 assembled.

The angular relation of the end 54 of the intermediate member 20 may be varied up to an angle of 45° relative to the plane of the juncture between the body portion 16 and the intermediate member 20 without departing from the spirit of my invention. Also the angular relation of the projection 58 relative to the axis of the spherical recess 56 in the intermediate member 20 may be varied from an angular relation perpendicular to the juncture between the intermediate member 20 and the body portion 16, to an angular position perpendicular to the surface of the end 54 of the intermediate member 20. If desired the angular inclination can be divided between the contacting surfaces of the intermediate member 20 and the body portion 16, and if deemed expedient both ends of the intermediate member can be angularly inclined.

The angular adjustment of the mirror shell 18 and the intermediate member 20 may be varied through wide limits as desired to position the mirror in a desired angular relation.

The embodiment of Fig. 3 discloses a theft proof construction wherein the intermediate member 20 and the body portion 16 are maintained in assembled relation by means of a blind fastening wherein a projection 70 carried by the intermediate member 20 is yieldingly urged by a spring 72 interposed between a clip 74 nesting in a groove 76 formed in the body portion 16 and a washer 78 secured to the projection 70 carried by the intermediate member 20. A pair of mirrors mounted on a vehicle may thus be readily adjusted to permit the driver to observe rear road and traffic conditions on both sides of the vehicle. Since such a large range of adjustment is provided, my improved mirror may be readily adjusted to meet the requirements of individual drivers varying widely in stature.

It will of course be understood that my invention is not limited to a construction wherein the support 26 of the supporting base and the mating portion 28 of the body portion 16 of the head assembly are in a plane parallel with the vehicle contacting portion of the base 10. The angular relation of the contacting surfaces 26 and 28 may be varied to incline the projection 30 at an angle of approximately 45° to each side of the right angular relation relative to the axis 14—14 of the base 10 as viewed in Fig. 2 without departing from the spirit of my invention.

If desired an additional angular adjustment may be employed between the vehicle contacting portion of the base 10 and the outer extremity of the base having the flat circular support 26 to permit angular adjustment about an axis extending parallel to the axis 14—14 of the base 10 as disclosed in my co-pending application Serial No. 101,571 filed June 27, 1949, now U. S. Patent No. 2,701,113, issued February 1, 1955.

It will also be apparent that my multi adjustment feature of a rear view mirror may be employed with mirrors having conventional supporting arms, and is not limited to mirrors having supporting bases of the so-called panel type.

I claim:

1. A rear view mirror assembly for a motor vehicle comprising a mirror, a shell supporting the mirror, a base spaced from the shell, a head assembly positioned between the shell and base and having a body portion engaging the base movable angularly about an axis extending substantially perpendicular to the vehicle contacting surfaces of the base, an intermediate member interposed between the body portion and the shell and having angularly related surfaces contacting the body portion and the shell, the intermediate member being movable angularly relative to said body portion about an axis extending substantially parallel to the vehicle contacting surface of the base, connecting means between the intermediate member and the shell whereby the shell may be adjusted angularly relative to said member, connecting means comprising cooperating substantially flat circuit contacting serrated surfaces between the base and the body portion and between the body portion and the intermediate member whereby the mirror shell may be adjusted angularly about intersecting axis relative to the base, and fastening means projecting through the body portion and being threaded into the intermediate member to hold the intermediate member in any angularly adjusted position on the body portion of the head assembly.

2. A rear view mirror assembly for a motor vehicle comprising a supporting base adapted to be secured to and extend outwardly from the side of a vehicle and having a substantially flat circular support, a mirror shell having a spherical attaching portion, a head assembly including a body portion having a substantially flat circular portion adapted to engage the support of the base, connecting means between the body portion and the base whereby the body portion may be adjusted angularly about an axis extending substantially perpendicular to the vehicle contacting surface of the base, cooperating serrated connecting means to hold the body portion in angularly adjusted positions on the base, an intermediate member, cooperating contacting surfaces between the body portion and the intermediate member, connecting means extending through the body portion to hold the intermediate member in angularly adjusted positions relative to the body portion, the intermediate member having non-parallel surfaces, the surface remote from the body portion having a spherical recess to receive the spherical attaching portion of the shell whereby the shell may be adjusted angularly relative to the intermediate member and the intermediate member may be adjusted angularly relative to body portion, and a mirror carried by the mirror shell.

3. A rear view mirror comprising a base having an inner surface adapted to contact a vehicle and an outer substantially flat circular supporting surface, a head assembly including a body portion having an inner substantially flat circular portion adapted to contact the outer substantially flat circular supporting surface of the base, serrated connecting means between the base and said body portion whereby said body portion may be adjusted angularly about an axis extending substantially perpendicular to the inner surface of the base, an intermediate member, substantially flat circular contacting surfaces between the body portion and the intermediate member, cooperating serrated connecting means between the body portion and the intermediate member, fastening means between the body portion and the intermediate member, the intermediate member having a non-parallel surface spaced from its body portion contacting surface and having a spherical recess, a mirror shell having a spherical attaching portion adapted to be secured in the spherical recess of said intermediate member for compound angular adjustment relative thereto, and a mirror carried by the mirror shell.

References Cited in the file of this patent
UNITED STATES PATENTS

| | | |
|---|---|---|
| 1,844,675 | Oishei et al. | Feb. 9, 1932 |
| 2,452,316 | Morley | Oct. 26, 1948 |
| 2,500,784 | Anderson | Mar. 14, 1950 |
| 2,533,475 | Koonter | Dec. 12, 1950 |
| 2,604,818 | Morgenstem | July 29, 1952 |
| 2,652,648 | Morley | Sept. 22, 1953 |